(12) United States Patent
Wang et al.

(10) Patent No.: US 10,521,872 B2
(45) Date of Patent: Dec. 31, 2019

(54) WATERMARK ADJUSTMENT METHOD AND DEVICE

(71) Applicant: Zhuhai Seine Technology CO., Ltd., Zhuhai (CN)

(72) Inventors: Heng Wang, Zhuhai (CN); Dan Xiong, Zhuhai (CN)

(73) Assignee: ZHUHAI SEINE TECHNOLOGY CO., LTD., Zhuhai (CN)

( * ) Notice: Subject to any disclaimer, the term of this patent is extended or adjusted under 35 U.S.C. 154(b) by 226 days.

(21) Appl. No.: 15/787,118

(22) Filed: Oct. 18, 2017

(65) Prior Publication Data

US 2018/0122034 A1 May 3, 2018

(30) Foreign Application Priority Data

Oct. 31, 2016 (CN) .......................... 2016 1 0928579

(51) Int. Cl.
*G06T 11/60* (2006.01)
*H04N 1/32* (2006.01)
(Continued)

(52) U.S. Cl.
CPC ............ *G06T 1/0028* (2013.01); *G06T 11/60* (2013.01); *G11B 27/02* (2013.01); *H04N 1/32149* (2013.01); *G06T 2201/0202* (2013.01)

(58) Field of Classification Search
CPC .......... H04N 1/32149; H04N 1/32165; H04N 21/234327; H04N 21/4627; H04N 21/47202; H04N 21/4753; H04N 21/8355; H04N 7/17318; H04N 1/32144; G06T 11/60; G06T 1/0028; G06T 2201/0202; G11B 27/02
(Continued)

(56) References Cited

U.S. PATENT DOCUMENTS

| | | | |
|---|---|---|---|
| 2006/0083403 A1* | 4/2006 | Zhang | G06T 1/0028 382/100 |
| 2008/0089552 A1* | 4/2008 | Nakamura | G06T 1/0085 382/100 |

(Continued)

FOREIGN PATENT DOCUMENTS

| | | |
|---|---|---|
| CN | 1830665 A | 9/2006 |
| CN | 101261569 A | 9/2008 |

(Continued)

*Primary Examiner* — Negussie Worku
(74) *Attorney, Agent, or Firm* — Anova Law Group, PLLC

(57) ABSTRACT

A watermark adjustment method and a watermark adjustment device are provided. The method includes determining whether a user clicks on a watermark preview interface in a predetermined manner; when it is determined that the user clicks on the watermark preview interface in the predetermined manner, generating a text box control according to a watermark pattern that is currently displayed to activate a watermark preview editing status; displaying the watermark pattern on the text box control; determining a text box display parameter according to a user setting for the text box control; and when the watermark preview editing status is ended, adjusting the watermark pattern according to the text box display parameter and displaying the adjusted watermark pattern in the watermark preview interface.

16 Claims, 16 Drawing Sheets

(51) Int. Cl.
*G06T 1/00* (2006.01)
*G11B 27/02* (2006.01)

(58) Field of Classification Search
USPC ......... 713/176, 168, 178; 380/210; 386/252, 386/353; 358/3.28
See application file for complete search history.

(56) References Cited

U.S. PATENT DOCUMENTS

| | | | | |
|---|---|---|---|---|
| 2012/0082337 A1* | 4/2012 | Ohira | ................. | G06T 1/0028 382/100 |
| 2013/0170695 A1* | 7/2013 | Anan | ................... | G06T 1/0021 382/100 |
| 2014/0118793 A1* | 5/2014 | Wyatt | ............... | H04N 1/32229 358/3.28 |
| 2014/0241568 A1* | 8/2014 | Yamada | ............... | G06T 1/0021 382/100 |
| 2016/0196630 A1* | 7/2016 | Blesser | ................. | G10L 19/018 382/100 |
| 2016/0198064 A1* | 7/2016 | Bai | ......................... | H04N 1/54 382/100 |
| 2016/0210717 A1* | 7/2016 | Adsumilli | ............. | G06T 1/0028 |
| 2016/0210971 A1* | 7/2016 | Adsumilli | ............. | G10L 19/018 |
| 2016/0212441 A1* | 7/2016 | Adsumilli | ............. | H04N 19/63 |
| 2017/0006182 A1* | 1/2017 | Marinkin | .............. | G06T 1/0028 |
| 2017/0024845 A1* | 1/2017 | Filler | .................... | G06T 1/0028 |
| 2017/0329943 A1* | 11/2017 | Choi | ........................ | H04L 9/088 |
| 2018/0113659 A1* | 4/2018 | Matsui | ................. | G06F 3/1204 |

FOREIGN PATENT DOCUMENTS

| | | |
|---|---|---|
| CN | 101611620 A | 12/2009 |
| CN | 102103736 A | 6/2011 |
| CN | 102574404 A | 7/2012 |
| CN | 102881034 A | 1/2013 |
| CN | 104144297 A | 11/2014 |
| CN | 104835105 A | 8/2015 |
| KR | 100675859 B1 | 2/2007 |

* cited by examiner

WATERMARK ADJUSTMENT METHOD AND DEVICE

CROSS-REFERENCES TO RELATED APPLICATIONS

This application claims priority of Chinese Patent Application No. 201610928579.7, filed on Oct. 31, 2016, the entire contents of which are hereby incorporated by reference.

FIELD OF THE INVENTION

The present disclosure generally relates to the field of information processing technology and, more particularly, relates to a watermark adjustment method and a watermark adjustment device.

BACKGROUND

In watermark technology, certain identification related to or not related to document contents is directly embedded into the document contents. The embedded identification may not affect the use of the original document contents, and the embedded identification may not be easily perceived or noticed by a user.

A "watermark function", e.g., a "watermark function" of a printer driver, can add a watermark to a to-be-printed document, i.e., a document to be printed, such that the watermark may be embedded into the printed document. The watermark may include textual contents, e.g., "copy", "confidential", "company secret", and/or the like.

In order to change a watermark content, to adjust an embedment position of a watermark content in a to-be-printed document, and/or to adjust a font of a watermark, etc., a user generally enters the watermark setting interface of a printer driver, selects or creates a watermark entry, activates the watermark parameter setting interface, and sets the content, font, angle, and/or location coordinates of the watermark, etc. However, when the user needs to adjust the angle of the watermark, the size of the watermark, the horizontal position of the watermark content, the vertical position of the watermark content, and/or another parameter of the watermark, it may be difficult for the user to estimate certain parameter values. Thus, in order to achieve a desired effect, the user needs to repeatedly set parameters and switch between various interfaces back and forth, and such operation can be complex.

The disclosed watermark adjustment method and watermark adjustment device are directed to solve one or more problems set forth above and other problems.

BRIEF SUMMARY OF THE DISCLOSURE

One aspect of the present disclosure provides a method of adjusting watermark. The method includes determining whether a user clicks on a watermark preview interface in a predetermined manner; when it is determined that the user clicks on the watermark preview interface in the predetermined manner, generating a text box control according to a watermark pattern that is currently displayed to activate a watermark preview editing status; displaying the watermark pattern on the text box control; determining a text box display parameter according to a user setting for the text box control; and when the watermark preview editing status is ended, adjusting the watermark pattern according to the text box display parameter and displaying the adjusted watermark pattern in the watermark preview interface.

Another aspect of the present disclosure provides a watermark adjustment device. The watermark adjustment device includes a first decision unit configured to determine whether a user clicks on a watermark preview interface in a predetermined manner; a generating unit configured to, when it is determined that the user clicks on the watermark preview interface in the predetermined manner, generate a text box control according to a watermark pattern that is currently displayed to activate a watermark preview editing status; a first display unit configured to display the watermark pattern on the text box control; a determination unit configured to determine a text box display parameter according to a user setting for the text box control; and a second display unit configured to, when the watermark preview editing status is ended, adjust the watermark pattern according to the text box display parameter and display the adjusted watermark pattern in the watermark preview interface.

Other aspects of the present disclosure can be understood by those skilled in the art in light of the description, the claims, and the drawings of the present disclosure.

BRIEF DESCRIPTION OF THE DRAWINGS

The following drawings are merely examples for illustrative purposes according to various disclosed embodiments and are not intended to limit the scope of the present disclosure.

DETAILED DESCRIPTION

Reference will now be made in detail to exemplary embodiments of the disclosure, which are illustrated in the accompanying drawings. Hereinafter, embodiments consistent with the disclosure will be described with reference to drawings. Wherever possible, the same reference numbers will be used throughout the drawings to refer to the same or like parts. It is apparent that the described embodiments are some but not all of the embodiments of the present invention. Based on the disclosed embodiments, persons of ordinary skill in the art may derive other embodiments consistent with the present disclosure, all of which are within the scope of the present disclosure. Further, in the present disclosure, the disclosed embodiments and the features of the disclosed embodiments may be combined under conditions without conflicts.

As used herein and in the appended claims, the singular forms "a," "an," and "the" include the plural reference unless the context clearly dictates otherwise. Thus, for example, a reference to "an element" is a reference to one or more elements and includes equivalents thereof known to those skilled in the art.

It is to be understood that the term "and/or" as used herein may be used to describe association relationships for items, including any suitable combination of one or more related items listed. For example, "A and/or B" may indicate that A exists alone, B exists alone, or both A and B exist.

When a user needs to adjust an angle of watermark, a size of watermark, a horizontal position of watermark content, a vertical position of watermark content, and/or anther parameter of watermark, it may be difficult for the user to estimate certain parameter values, and the user may need to repeatedly set parameters, thereby causing inconvenience.

Figure 1:
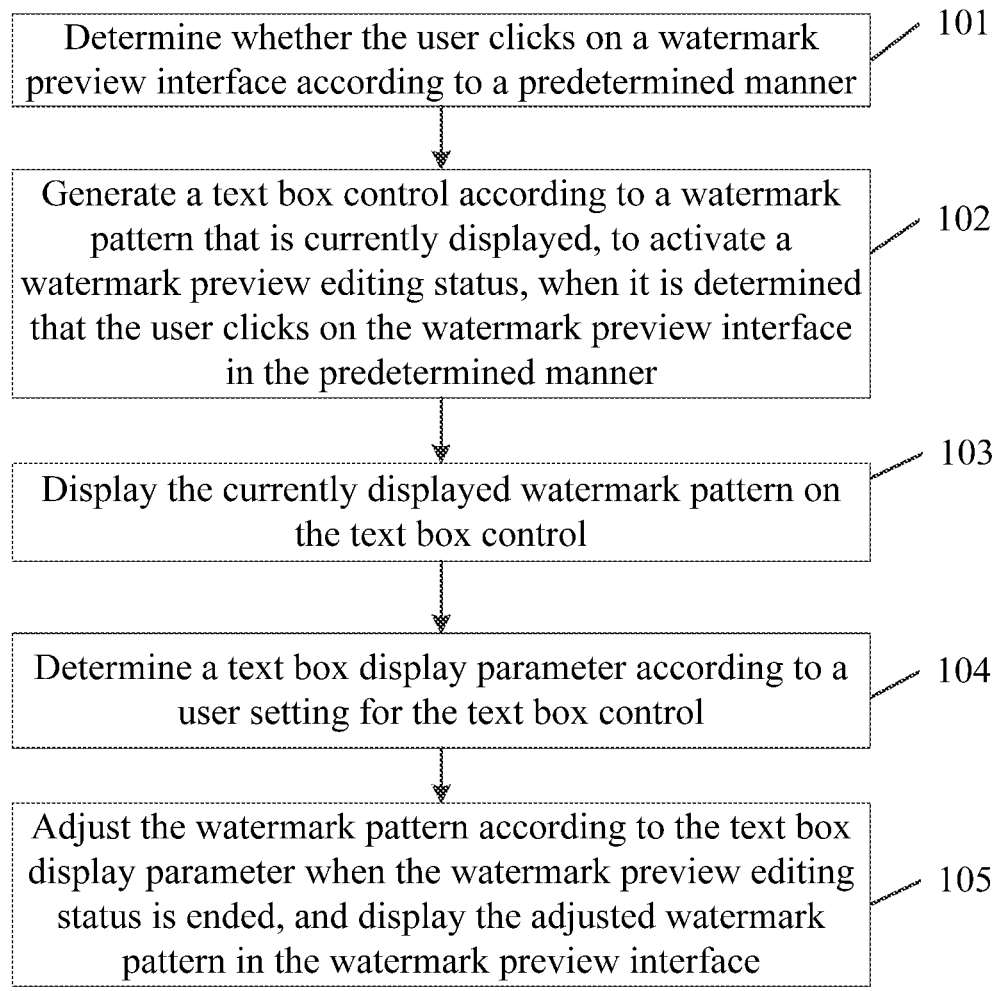
FIG. 1 illustrates a flow chart of an exemplary watermark adjustment method consistent with disclosed embodiments.

The present disclosure provides a watermark adjustment method applicable to a device that provides watermark editing. The present disclosure provides a watermark adjustment method that allows a user to directly edit on a watermark preview interface. FIG. 1 illustrates a flow chart of an exemplary watermark adjustment method consistent with disclosed embodiments. With reference to FIG. 1, the method includes the followings.

At Step 101, it is determined whether the user clicks on a watermark preview interface according to a predetermined manner.

The predetermined manner may include, for example, directly clicking or double-clicking on a watermark pattern that is displayed in a watermark preview interface, or clicking or double-clicking on a watermark pattern in a watermark list interface, or clicking on a designated function button. The above-described predetermined manner is merely for illustrative purposes and does not restrict the present disclosure. In the present disclosure, the predetermined manner may be selected according to various application scenarios, which is not restricted.

At Step 102, a text box control is generated according to a watermark pattern that is currently displayed, to activate a watermark preview editing status, when it is determined that the user clicks on the watermark preview interface in the predetermined manner.

In some embodiments, the text box control can serve as, for example, an input unit that is displayed to the user and allows the user to modify display contents in the corresponding text box, and that can provide the user with adjustment functions for directly modifying a position of a watermark pattern, a shape of a watermark pattern, and/or the like.

Further, for example, an operating system application programming interface (API) can be called to call a function such as "new CEdit( )" that is configured to generate a text box control object, such that a text box control may be dynamically generated. Further, according to a position and/or a size of a watermark content, a position and/or a size of the text box control may be adjusted, such that the text box control may cover the watermark content and display the watermark content, as shown in the dashed box shown in FIG. 2, i.e., a watermark window Q.

At Step 103, the watermark pattern that is currently displayed is displayed on the text box control.

At Step 104, a text box display parameter is determined according to a user setting for the text box control.

Figure 2:
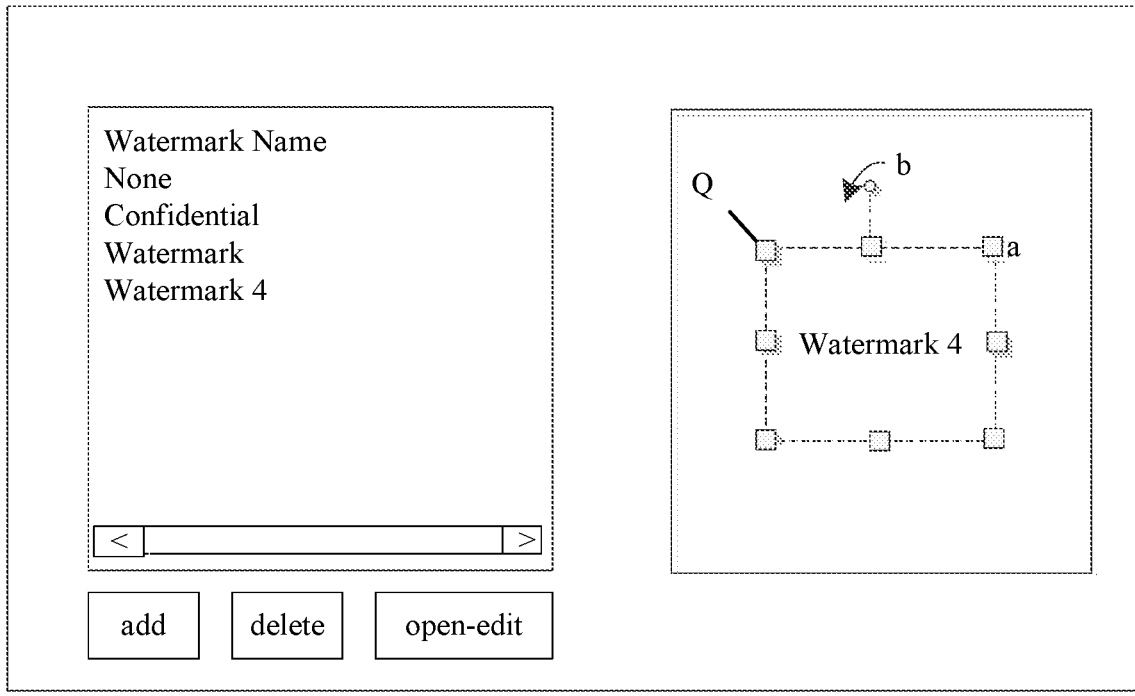
FIG. 2 illustrates a schematic view of an exemplary display interface related to watermark setting consistent with disclosed embodiments.

The text box control may include one or more controls, e.g., the control a and/or the control b shown in FIG. 2. When the watermark is switched to an editable status, i.e., an editing status, the user can edit the watermark content directly in the watermark window Q shown in FIG. 2. For example, "Watermark 4" may be changed to "Watermark" or the like. Further, a control in the watermark window Q such as the control "a" or the control "b" may be dragged through a mouse, a keyboard, or another input device, to modify a size, an angle, a position of the watermark, etc.

In some embodiments, the operation may be performed, for example, in a touch screen interface. The user not only can use an input device such as a mouse or a keyboard to drag a control in the watermark preview interface, thereby modifying a size, an angle, a position of the watermark, etc., but also can use the touch mode to edit the content, the angle, the position, the size of the watermark, etc.

At Step 105, when the watermark preview editing status is ended, the watermark pattern is adjusted according to the text box display parameter, and the adjusted watermark pattern is displayed in the watermark preview interface.

The user may end the watermark editing by, for example, clicking on a blank position outside the watermark preview interface, etc.

In some embodiments, a plurality of watermarks may be added to the watermark preview interface according to the above-described manner, and the user may edit the plurality of watermarks according to the above-described manner.

In the watermark adjustment method and the watermark adjustment device of the present disclosure, when the watermark preview interface is clicked on in a predetermined manner, a text box control may be generated. A text box display parameter may be determined by setting the text box control. The watermark pattern may be displayed in the watermark preview interface according to the text box display parameter. In conventional technology, in order to achieve a setting effect, the parameters may need to be adjusted repeatedly, and the user may need to switch to different interfaces repeatedly to realize editing and result viewing. The present disclosure provides a method that is intuitive and quick, thereby reducing user workload in a watermark printing process.

Figure 3:
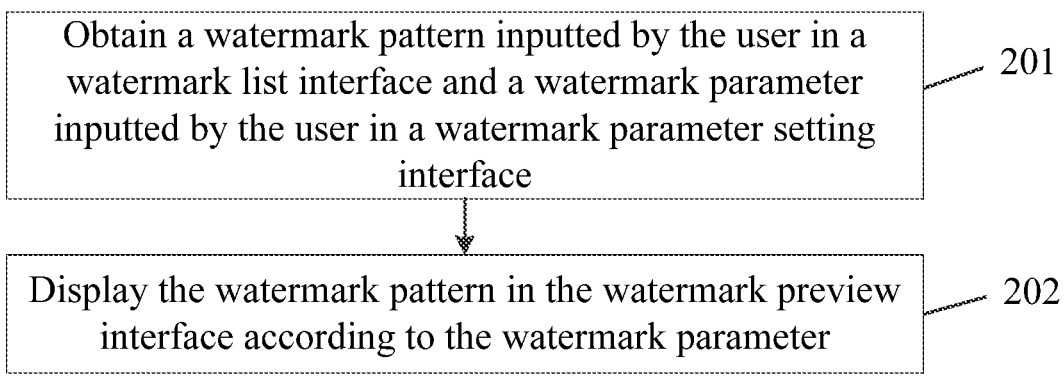
FIG. 3 illustrates a flow chart of another exemplary watermark adjustment method consistent with disclosed embodiments.

The method of the present disclosure may further include following steps. With reference to FIG. 3, the steps are described below.

At Step 201, a watermark pattern inputted by the user in a watermark list interface and a watermark parameter inputted by the user in a watermark parameter setting interface are obtained.

The watermark pattern may include various types of marking languages, e.g., "Confidential," "Watermark," "112," "112~1," "112~2," "11," "watermark 4," etc.

The watermark parameter may include, for example, at least one of a display position, a size, a tilt angle, or other parameters of the watermark used for displaying the watermark.

At Step 202, the watermark pattern is displayed in the watermark preview interface according to the watermark parameter.

Figure 4:
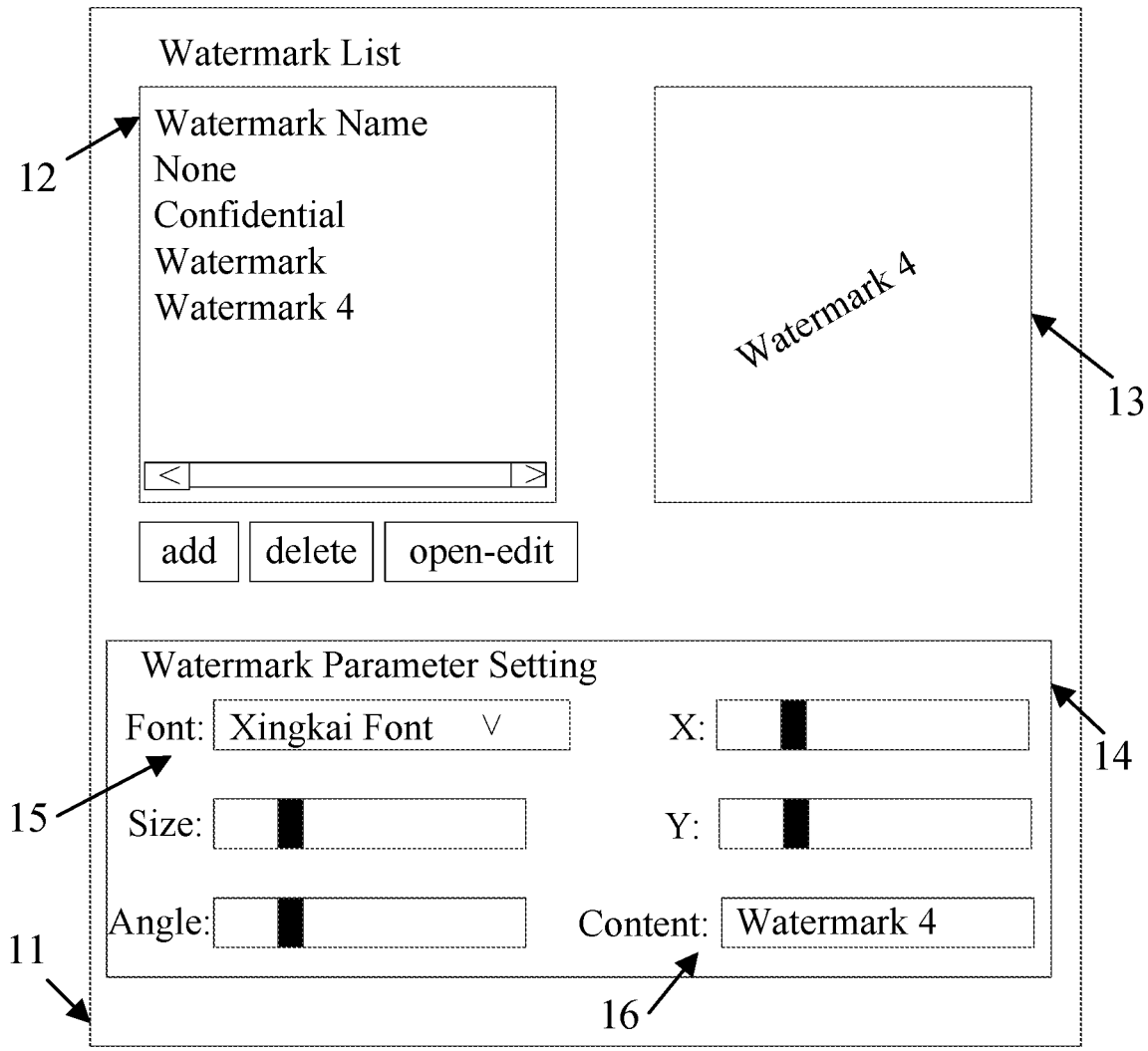
FIG. 4 illustrates another schematic view of an exemplary display interface related to watermark setting consistent with disclosed embodiments.

The watermark list interface, the watermark parameter setting interface, and the watermark preview interface may be configured in in a same display interface, such that the user can complete selecting watermark, setting one or more watermark parameters, and previewing a result in a same display interface. As shown in FIG. 4, the watermark list interface 12, the watermark parameter setting interface 14, and the watermark preview interface 13 are configured in the same display interface 11.

Figure 5:
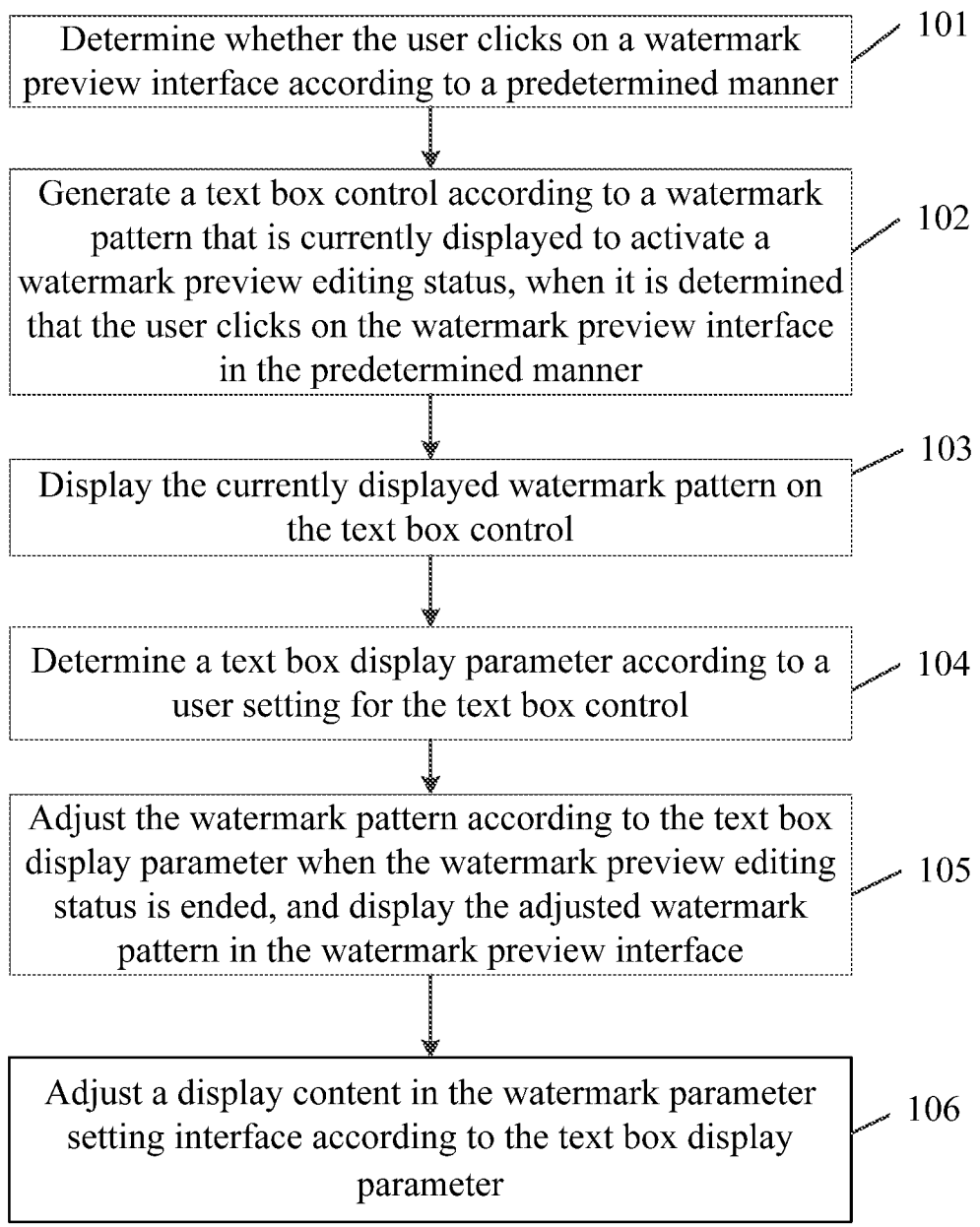
FIG. 5 illustrates a flow chart of another exemplary watermark adjustment method consistent with disclosed embodiments.

In some embodiments, after or when the watermark pattern is displayed in the watermark preview interface, the user may click on the watermark preview interface, and may use a generated text box for watermark adjustment. Further, the users may input watermark parameters in the watermark parameter setting interface to adjust the watermark. Further, in order to ensure consistency of parameter settings throughout the display interface, when the user is editing through the watermark preview interface, the watermark parameter setting interface can also adaptively modify parameters and the corresponding display content for convenient user viewing without a need for the user to perform modifications in the watermark parameter setting interface. Thus, after Step 105, Step 106 may be executed. With reference to FIG. 5, Step 106 is described below.

At Step 106, a display content in the watermark parameter setting interface is adjusted according to the text box display parameter. The display content in the watermark parameter setting interface may include, for example, display parameters for the watermark and a watermark content in the watermark parameter setting interface. The display parameters for the watermark in the watermark parameter setting interface may include, for example, "Font" 15 shown in FIG. 4. The watermark content in the watermark parameter setting interface may include, for example, "Content" 16 shown in FIG. 4.

Figure 6:
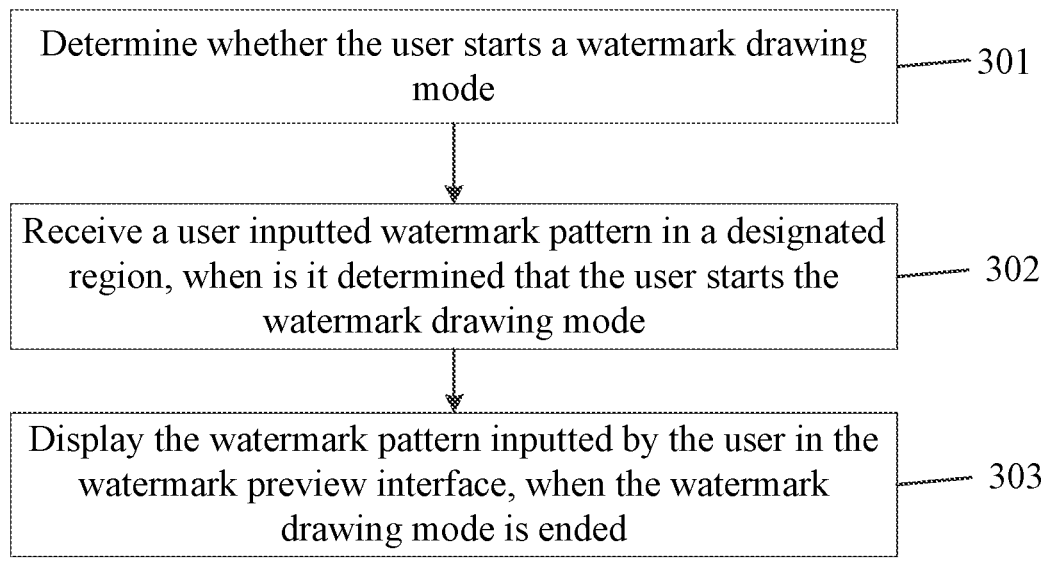
FIG. 6 illustrates a flow chart of another exemplary watermark adjustment method consistent with disclosed embodiments.

In addition to provided watermark patterns, a self-drawing function may be provided to the user, in order to meet more user needs. Accordingly, the present disclosure provides a watermark adjustment method including a watermark drawing method. With reference to FIG. 6, the watermark drawing method is described below.

At Step 301, it is determined whether the user starts a watermark drawing mode.

Figure 7:
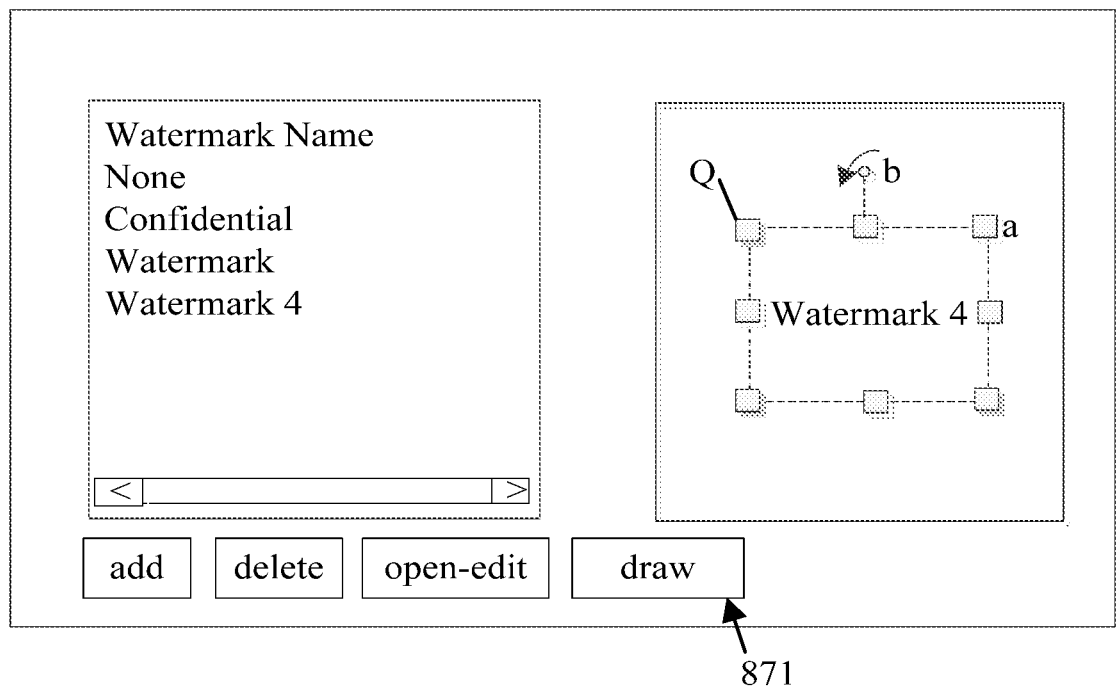
FIG. 7 illustrates another schematic view of an exemplary display interface related to watermark setting consistent with disclosed embodiments.

The user can start the watermark drawing mode by, for example, clicking on a designated function control such as a "draw" button 871 shown in FIG. 7.

At Step 302, when is it determined that the user starts the watermark drawing mode, a user inputted watermark pattern is received in a designated region.

The designated region can include, for example, a preset blank region or the watermark preview interface. If a watermark pattern already exists in the watermark preview interface, the original watermark pattern may be hidden or deleted, and a new watermark pattern may be captured by following a track inputted by the user. In some embodiments, a function such as an operating system API function may be called to capture the track that the user inputs. The operating system API function may include, for example, a function LineTo( ) for drawing lines and/or the like.

In some embodiments, the watermark pattern drawn by the user in the watermark preview interface may include, for example, a text-type pattern. The text-type pattern may be converted into a standard font format or a standard pattern style for displaying, in order to facilitate a follow-up adjustment, and the converted content may server as a basis for the follow-up adjustment.

At Step 303, when the watermark drawing mode is ended, the watermark pattern inputted by the user is displayed in the watermark preview interface.

In some embodiments, when the watermark drawing mode is ended, the watermark pattern inputted by the user may be displayed in the watermark preview interface, and the user can directly click on the watermark preview interface to generate a text box control and activate the watermark preview editing status, and adjust the watermark pattern. Further, when the watermark drawing mode is ended, the watermark pattern inputted by the user may be displayed in the watermark preview interface, and the user can adjust the watermark pattern by inputting watermark parameter values in the watermark parameter setting interface after turning on the watermark parameter setting interface.

The watermark preview interface not only may display, various types of marking languages, e.g., "Confidential", "Watermark", "112", "112~1", "112~2", "11", "Watermark 4", etc., but also may display image-type watermarks. The present disclosure provides a watermark adjustment method. The watermark adjustment method is described below.

At Step 1, it is determined whether the user starts an image watermark editing mode.

Figure 19:
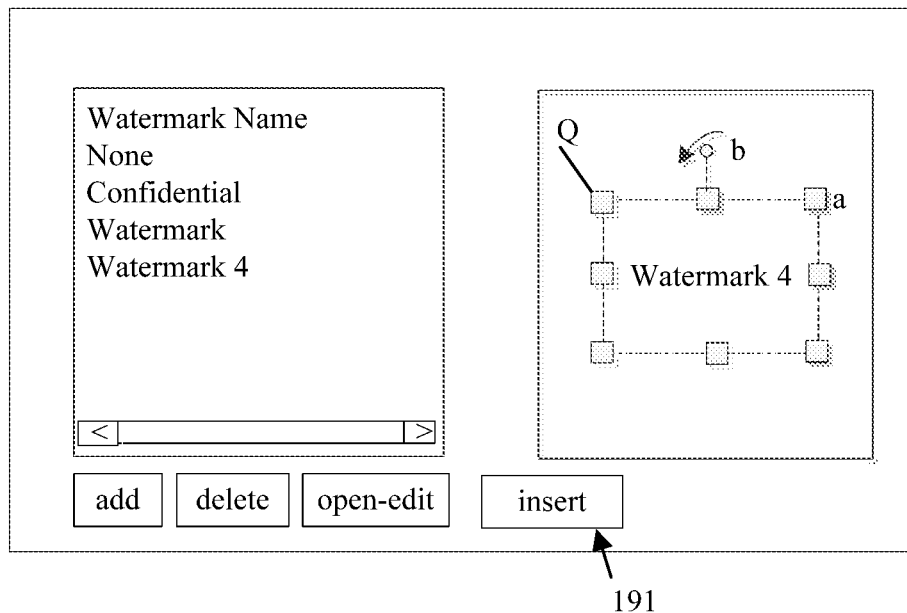
FIG. 19 illustrates another schematic view of an exemplary display interface related to watermark setting consistent with disclosed embodiments.

The user may click on a designated function control, e.g., an "insert" button 191 shown in FIG. 19, to trigger the user to further select an "insert local image" option or an "insert online image" option.

At Step 2, based on the user's selection, a watermark image chosen by the user is displayed in the watermark preview interface.

If the user selects the "insert local image" option, a local picture/photo selection interface is visited, and based on the user's selection, an image or photo stored in a computer, a mobile phone, or another terminal may be displayed in the watermark preview interface. If the user selects the "insert online picture" option, based on the user's selection, a search application program control installed on a computer, a mobile phone, or another terminal may be called, and a desired image may be searched and selected according to a keyword inputted by the user, and then displayed in the watermark preview interface.

In some embodiments, the image or photo selected by the user can be displayed in an editable status, i.e., an editing status, in the watermark preview interface. An image editing status may be activated in response to a user's operation such as clicking, double clicking, etc. When the image or photo selected by the user appears in the watermark preview interface at an editable status, the user can drag a control in the watermark preview interface to edit a position, a size, or an angle of the image or the photo, etc. That is, when the user selected image or photo is displayed in the text box control, the user can drag a control in the watermark preview interface to edit a position, a size, or an angle of the image or the photo, etc. Further, the user can also edit a position, a size, or an angle of the image or the photo, etc., through a manual touch manner.

The present disclosure also provides a watermark adjustment method. The watermark adjustment method may include converting a watermark, e.g., a watermark displayed in the watermark preview interface, to a target language and displaying the converted watermark in the watermark preview interface, according to the target language selected by the user.

Figure 20:
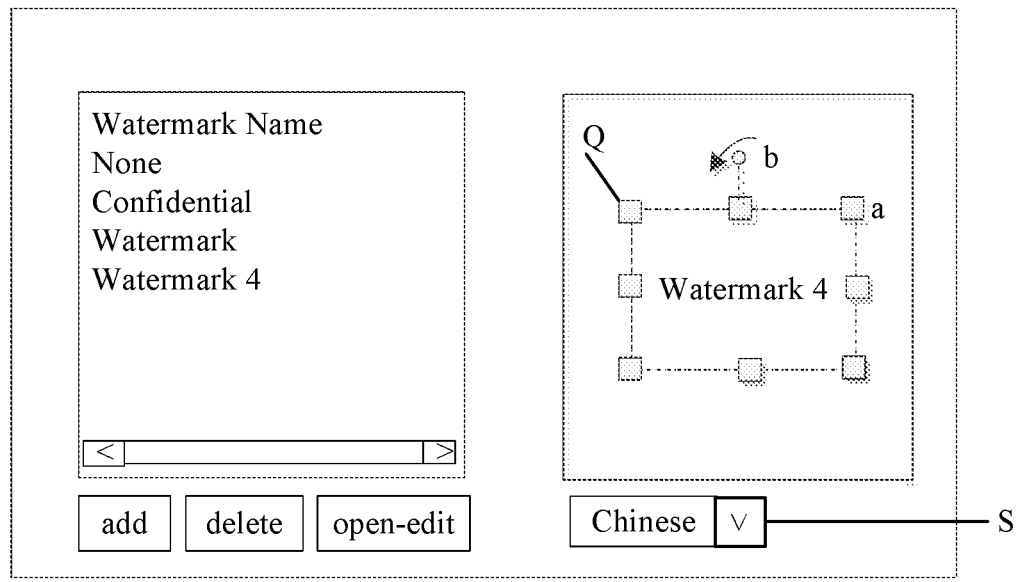
FIG. 20 illustrates another schematic view of an exemplary display interface related to watermark setting consistent with disclosed embodiments.

For example, according to a target language selected by the user, such as Chinese, English, Korean, etc., the language of the watermark displayed in the watermark preview interface may be automatically changed to the target language selected by the user. The user may select the target language in, for example, a drop-down option list such as the drop-down option list S containing multiple language options in the watermark setting interface shown in FIG. 20.

Specifically, based on the target language selected by the user, translation may be performed by calling a translation application program control installed on a mobile phone, a computer, or another terminal. A driver program such as a printer driver program may obtain the translated watermark and display the translated watermark in the watermark preview interface. That is, the driver program may obtain the translated watermark and display the translated watermark in the text box control in the watermark preview interface. The user can drag a control in the watermark preview interface to edit the size of watermark, angle of watermark, position of watermark, etc.

Figure 8:
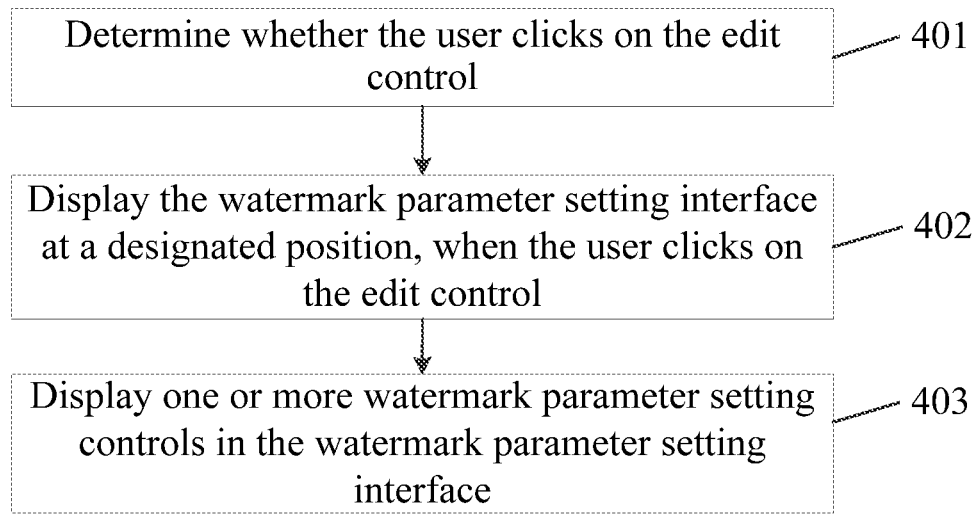
FIG. 8 illustrates a flow chart of another exemplary watermark adjustment method consistent with disclosed embodiments.

Because the user may choose a default watermark setting to print the watermark, the watermark parameter setting interface may be configured to hide by default, and a clickable edit control may be provided for user to start the watermark parameter setting interface. Accordingly, the present disclosure provides a process. With reference to FIG. 8, the process is described below.

At Step 401, it is determined whether the user clicks on the edit control.

Figure 9:
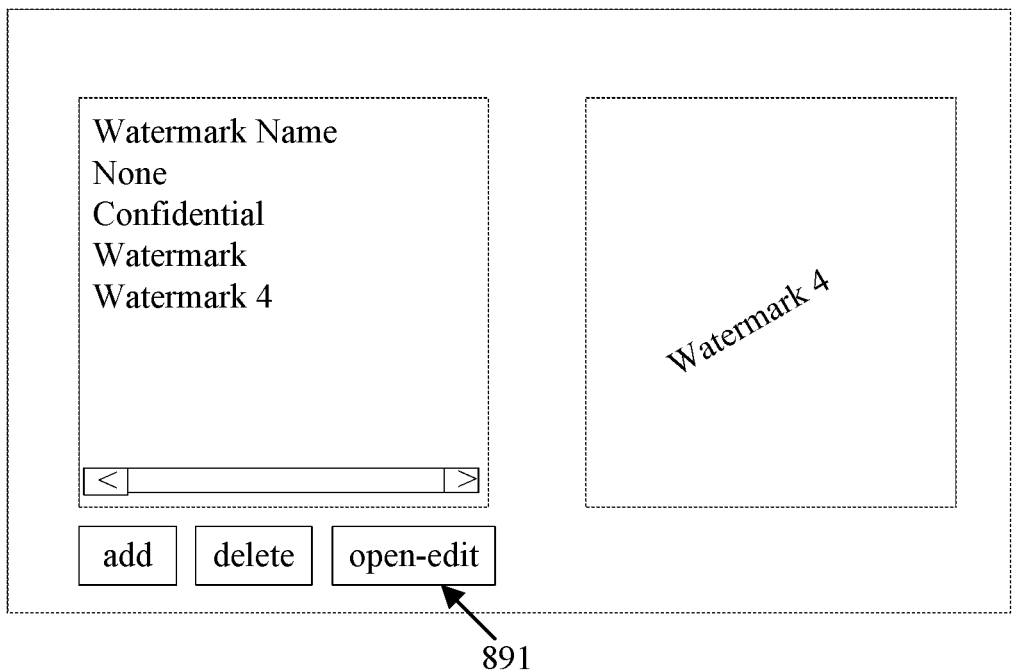
FIG. 9 illustrates another schematic view of an exemplary display interface related to watermark setting consistent with disclosed embodiments.

The edit control can include, for example, a switch for turning on the watermark parameter setting interface. The edit control can be display as, for example, a function key, a designated graph, or a button in another form. FIG. 9 illustrates an exemplary display interface that is not displaying the watermark parameter setting interface consistent with disclosed embodiments. The edit control may include, for example, the "open-edit" button 891 shown in FIG. 9. Effect before and after the watermark parameter setting interface is turned on can be observed by comparing FIG. 9 and FIG. 4.

The edit control may be clicked on in a manner such as a clicking, i.e., a single clicking, a double clicking, or another similar designated action, which is not restricted in the present disclosure.

At Step 402, when the user clicks on the edit control, the watermark parameter setting interface is displayed at a designated position.

The designated position can be configured in advance by a designer, and may also be adjusted dynamically by a user having a modification permission, according to various application scenarios.

At Step 403, one or more watermark parameter setting controls are displayed in the watermark parameter setting interface.

The one or more watermark parameter setting controls may at least include, for example, a watermark font setting control, a watermark size setting control, a watermark tilt angle control, and/or a watermark position setting control. The above-described functions, i.e., the above-described controls, are merely for illustrative purposes and do not limit the present disclosure. Controls may be modified, deleted, or added according to various application scenarios, which are not restricted in the present disclosure.

In conjunction with the various functional controls described above, the present disclosure also provides a parameter determination method. The parameter determination method is described below.

A watermark font selected by the user on the watermark font setting control is obtained. A watermark font for use when displaying the watermark in the watermark preview interface is determined according to the user selected watermark font.

The watermark font setting control may have options including, for example, a Xingkai font, a Songti font, and/or other appropriate fonts. The options may be displayed to the user through, for example, a list, a drop-down menu, or another appropriate form. For example, FIG. 4 illustrates an exemplary drop-down menu display for a watermark font.

A watermark size parameter set by the user on the watermark size setting control is obtained. A watermark size for use when displaying the watermark in the watermark preview interface is determined according to the user selected watermark size parameter.

The watermark size setting control may have options including, for example, a small-II (i.e., 12-point) font size, a II (i.e., 22-point) font size, a small-III (i.e., 15-point) font size, a III (i.e., 16-point) font size, etc. The options may be displayed to the user through, for example, a parameter bar, a progress bar, or another appropriate form. For example, FIG. 2 illustrates an exemplary progress bar display for a watermark size parameter.

A watermark tilt angle set by the user on the watermark tilt angle control is obtained. A watermark tilt angle for use when displaying the watermark in the watermark preview interface is determined according to the user selected watermark tilt angle.

The adjustment range provided by the watermark tilt angle control can be, for example, from approximately −90 degrees to approximately 90 degrees, and may be displayed to the user through, for example, a parameter bar, a progress bar, or another appropriate form. For example, FIG. 4 illustrates an exemplary progress bar display for a watermark tilt angle.

A watermark position parameter selected by the user on the watermark position setting control is obtained. A display position of the watermark in the watermark preview interface is determined according to the user selected watermark position parameter.

The watermark position setting control may be displayed to the user through, for example, a coordinate group, or an independent progress bar in X direction and an independent progress bar in Y direction, or another appropriate form. For example, FIG. 4 illustrates an exemplary display manner using independent progress bars in X and Y directions.

Further, after setting the watermark parameters according to the above-described operation procedure, the watermark pattern may need to be displayed in the watermark preview interface according to the set watermark parameters. In the watermark adjustment method of the present disclosure, the watermark parameter setting interface may be turned on by clicking on an edit control, such that the watermark parameter setting interface, the watermark preview interface, and the watermark list interface may be displayed in a same interface, i.e., a same watermark setting interface. The user can observe the watermark preview result after changing the watermark parameter setting in the same interface, thereby reducing the number of operations of switching between interfaces.

Figure 10:
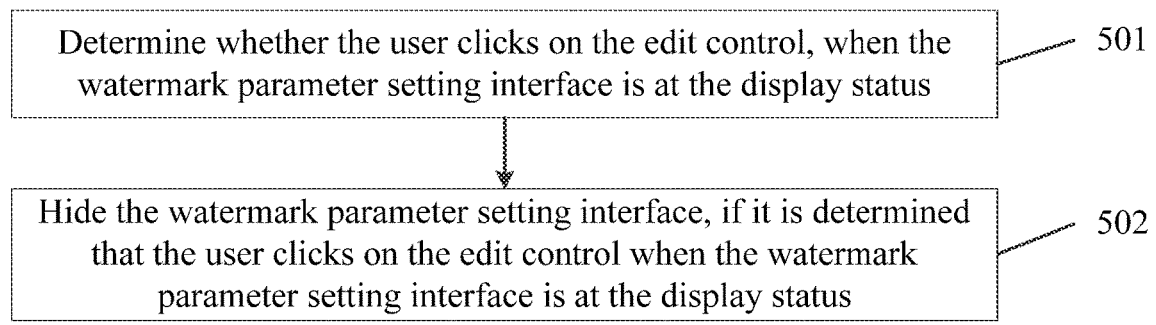
FIG. 10 illustrates a flow chart of another exemplary watermark adjustment method consistent with disclosed embodiments.

Further, the watermark parameter setting interface can be hidden after the watermark parameter setting is completed. Accordingly, the present disclosure provides a process. With reference to FIG. 10, the process is described below.

At Step 501, it is determined whether the user clicks on the edit control, when the watermark parameter setting interface is at the display status.

At Step 502, if it is determined that the user clicks on the edit control when the watermark parameter setting interface is at the display status, the watermark parameter setting interface is hidden.

In some embodiments, after the watermark parameter setting interface is closed, a print setting interface may be displayed at a display position of the watermark parameter setting interface, e.g., a previous display position of the watermark parameter setting interface. The print setting interface may include, for example, a print resolution setting, a print orientation setting, etc. Accordingly, the use of the print interface may be optimized, the number of operations of switching between interfaces may be reduced, and convenient operations may be provided to users.

Figure 11:
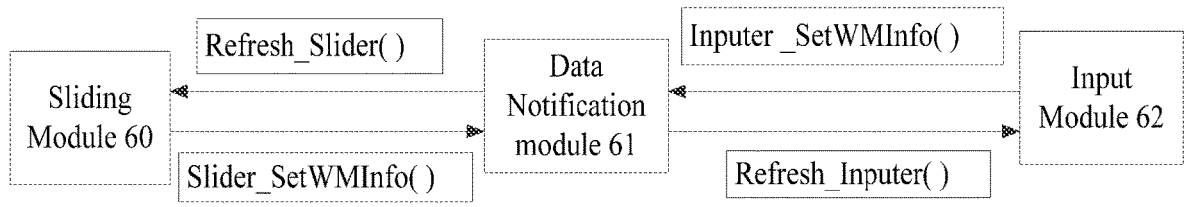
FIG. 11 illustrates a block diagram of exemplary data communication modules for data communications between an exemplary watermark preview interface and an exemplary watermark parameter setting interface consistent with disclosed embodiments.

FIG. 11 illustrates a block diagram of exemplary data communication modules for data communications between an exemplary watermark preview interface and an exemplary watermark parameter setting interface consistent with disclosed embodiments.

As shown in FIG. 11, exemplary data communication modules include a sliding module 60, a data notification module 61, and an input module 62.

The sliding module 60 may be configured to adjust watermark parameters in a watermark window. For example, the sliding module 60 may be configured to adjust parameters such as a size, an angle, or a position of a watermark in a watermark window by using, for example, a mouse, a keyboard, or another appropriate input method.

The input module 62 may be configured to perform parameter setting in a watermark parameter setting interface. For example, the input module 62 may be configured to perform parameter setting in the watermark parameter setting interface by, for example, using provided data or adjusting one or more progress bars.

The data notification module 61 may be configured to receive data from the input module 62 or the sliding module 60 and transmit the data.

Referring to FIG. 11, an interface function Slider_setWMInfo( ) of the data notification module 61 transmits data from the sliding module 60 to the data notification module 61. Another interface function Inputer_SetWMInfo( ) of the data notification module 61 transmits data from the input module 62 to the data notification module 61. Functions Refresh_Inputer( ) and Refresh_Slider( ) are configured to refresh an interface of the input module 62 and an interface of the sliding module 60 according to watermark parameter setting transmitted from the data notification module 61, respectively. That is, the function Refresh_Inputer( ) is configured to adjust, for example, a parameter input value and/or a progress bar in the watermark parameter setting interface according to the watermark parameter setting transmitted from the data notification module 61. The function Refresh_Slider( ) is configured to adjust, for example, a watermark in a watermark window, according to the watermark parameter setting transmitted from the data notification module 61.

When the user adjusts one or more watermark parameters in a watermark window using an input device such as a mouse or a keyboard, the sliding module 60 calls the interface function Slider_setWMInfo( ) of the data notification module 61 to send a latest watermark parameter setting to the data notification module 61. Further, the data notification module 61 executes the function Refresh_Inputer( ) to update one or more parameter values in the watermark parameter setting interface, e.g. inputted parameter values and/or progress bars in the watermark parameter setting interface. Thus, parameters in the watermark parameter setting interface, e.g., inputted parameter values and/or progress bars in the watermark parameter setting interface, may be updated accordingly, as an input device such as a mouse or a keyboard is used to adjust the watermark in the watermark window.

Similarly, when the user inputs one or more watermark parameters in the watermark parameter setting interface, the input module 62 calls the interface function Inputer_SetWMInfo( ) of the data notification module 61 to send a latest watermark parameter setting to the data notification module 61 for storing. Then Refresh_Slider( ) is called to refresh one or more parameter values in a sliding setting region, i.e., a watermark window. Accordingly, watermark parameter adjustment may be achieved by inputting parameters in the watermark parameter setting interface.

Figure 12:
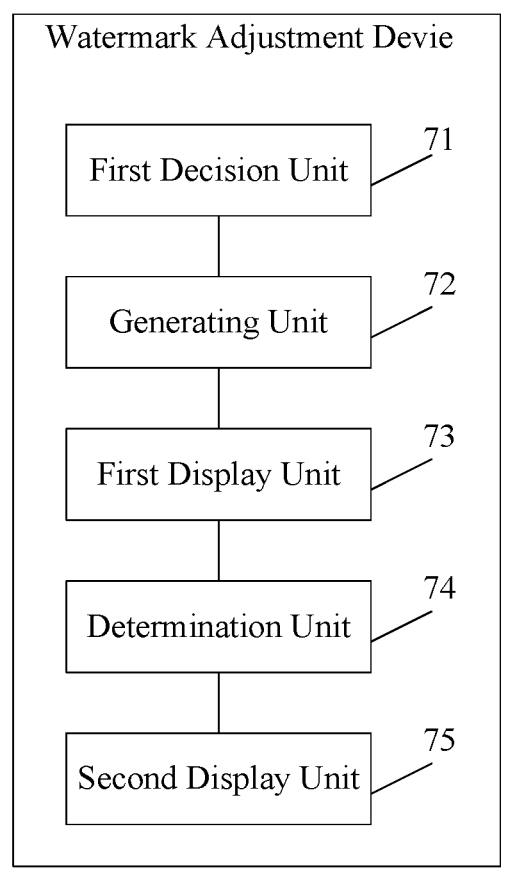
FIG. 12 illustrates a block diagram of an exemplary watermark adjustment device consistent with disclosed embodiments.

In conjunction with the above-described process, the present disclosure also provides a watermark adjustment device. FIG. 12 illustrates a block diagram of an exemplary watermark adjustment device consistent with disclosed embodiments. As shown in FIG. 12, the exemplary watermark adjustment device includes a first decision unit 71, a generating unit 72, a first display unit 73, a determination unit 74, and a second display unit 75.

The first decision unit 71 may be configured to determine whether the user clicks on the watermark preview interface in a predetermined manner.

The generating unit 72 may be configured to generate a text box control according to a watermark pattern that is currently displayed, to activate a watermark preview editing status, if it is determined that the user clicks on the watermark preview interface in the predetermined manner.

The first display unit 73 may be configured to display the currently displayed watermark pattern (i.e., the watermark pattern that is currently displayed) on the text box control.

The determination unit 74 may be configured to determine a text box display parameter according to a user setting for the text box control.

The second display unit 75 may be configured to, when the watermark preview editing status is ended, adjust the watermark pattern according to the text box display parameter, and display the adjusted watermark pattern in the watermark preview interface.

Figure 13:
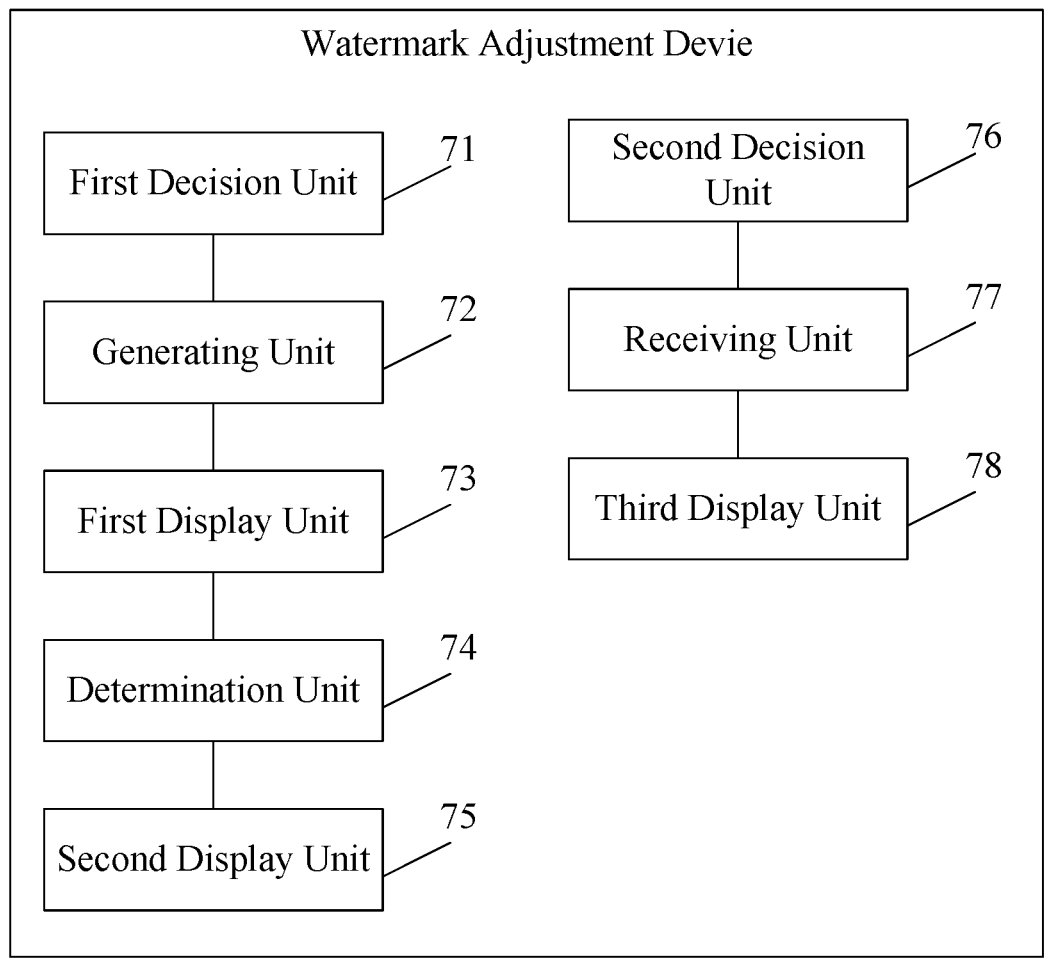
FIG. 13 illustrates a block diagram of another exemplary watermark adjustment device consistent with disclosed embodiments.

In some embodiments, the watermark adjustment device may further include other units as shown in FIG. 13. FIG. 13 illustrates a block diagram of another exemplary watermark adjustment device consistent with disclosed embodiments. As shown in FIG. 13, the exemplary watermark adjustment device further includes a second decision unit 76, a receiving unit 77, and a third display unit 78, in addition to the first decision unit 71, the generating unit 72, the first display unit 73, the determination unit 74, and the second display unit 75.

The second decision unit 76 may be configured to determine whether the user starts a watermark drawing mode;

The receiving unit 77 may be configured to receive a user inputted watermark pattern in a designated region, when it is determined that the user starts the watermark drawing mode.

The third display unit 78 may be configured to display the user inputted watermark pattern in the watermark preview interface, when the watermark drawing mode is ended.

Figure 14:
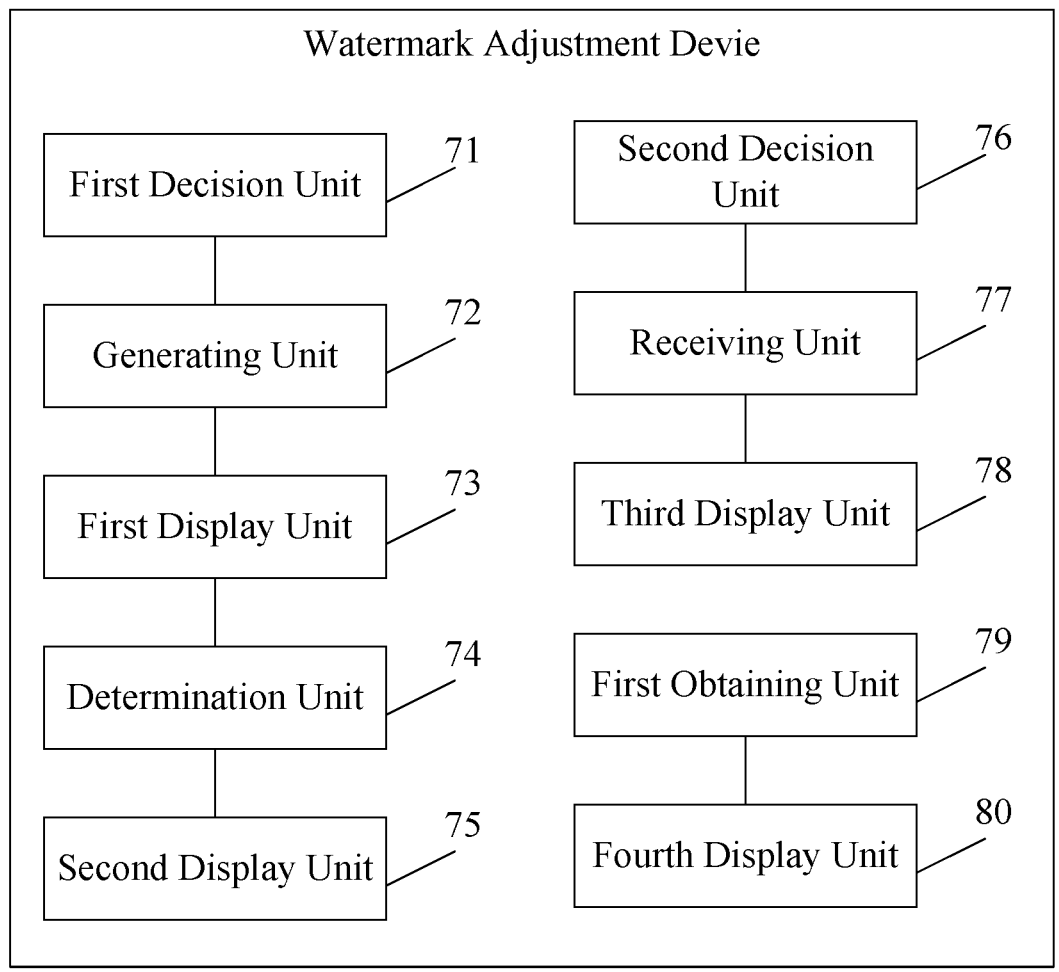
FIG. 14 illustrates a block diagram of another exemplary watermark adjustment device consistent with disclosed embodiments.

In some embodiments, the watermark adjustment device may further include other units as shown in FIG. 14. FIG. 14 illustrates a block diagram of another exemplary watermark adjustment device consistent with disclosed embodiments. As shown in FIG. 14, the exemplary watermark adjustment device further includes a first obtaining unit 79 and a fourth display unit 80, in addition to the first decision unit 71, the generating unit 72, the first display unit 73, the determination unit 74, the second display unit 75, the second decision unit 76, the receiving unit 77, and the third display unit 78.

The first obtaining unit 79 may be configured to obtain a watermark pattern inputted by the user through a watermark list interface, and a watermark parameter inputted by the user through a watermark parameter setting interface.

The fourth display unit 80 may be configured to display the watermark pattern in the watermark preview interface according to the watermark parameter.

Figure 15:
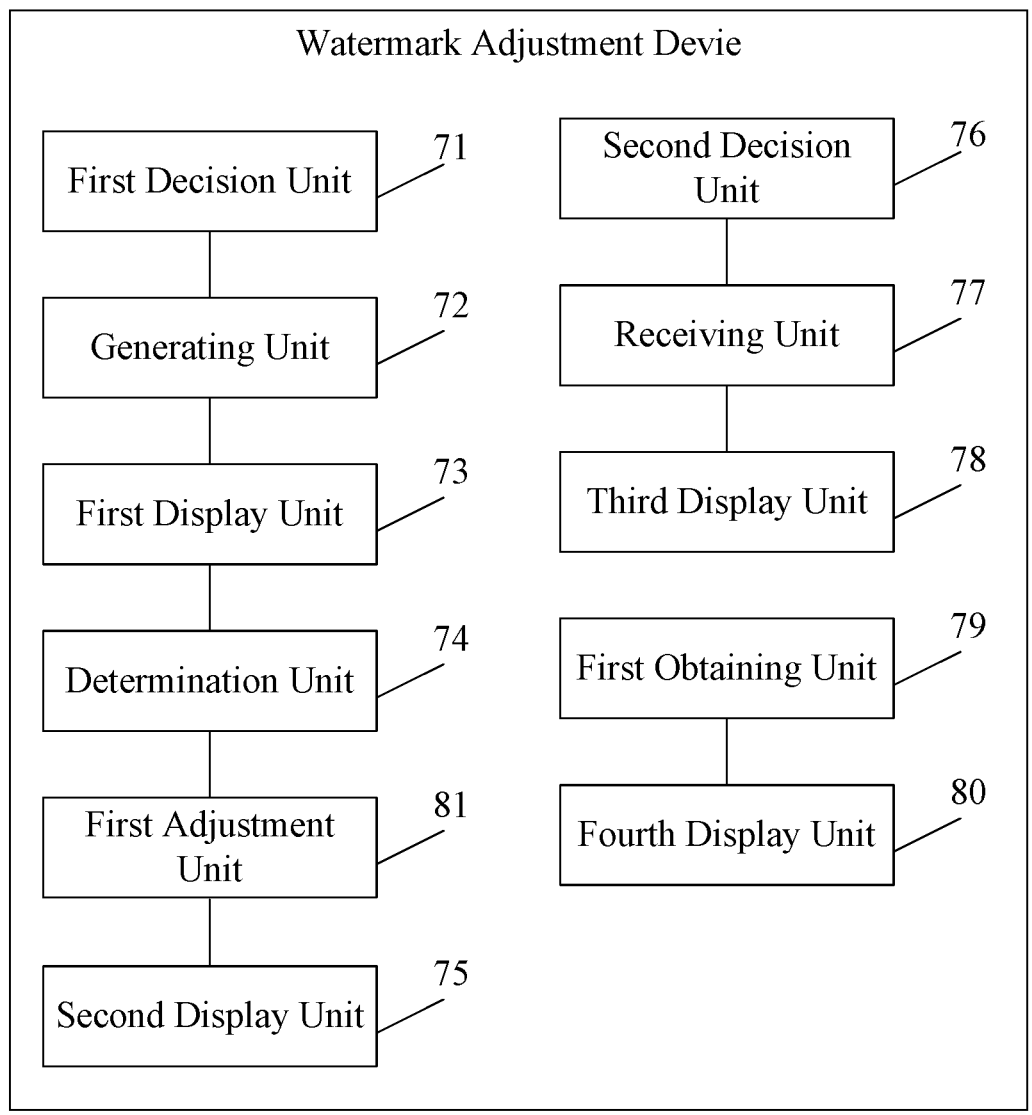
FIG. 15 illustrates a block diagram of another exemplary watermark adjustment device consistent with disclosed embodiments.

The watermark list interface, the watermark parameter setting interface, and the watermark preview interface may be configured in in a same display interface, In some embodiments, the watermark adjustment device may further include one or more other units as shown in FIG. 15. FIG. 15 illustrates a block diagram of another exemplary watermark adjustment device consistent with disclosed embodiments. As shown in FIG. 15, the exemplary watermark adjustment device further includes a first adjustment unit 81, in addition to the first decision unit 71, the generating unit 72, the first display unit 73, the determination unit 74, the second display unit 75, the second decision unit 76, the receiving unit 77, the third display unit 78, the first obtaining unit 79, and the fourth display unit 80.

The first adjustment unit 81 may be configured to adjust a display content in the watermark parameter setting interface according to the text box display parameter. The display content in the watermark parameter setting interface may include, for example, display parameters for the watermark and a watermark content in the watermark parameter setting interface. The display parameters for the watermark in the watermark parameter setting interface may include, for example, "Font" 15 shown in FIG. 4. The watermark content in the watermark parameter setting interface may include, for example, "Content" 16 shown in FIG. 4.

Figure 16:
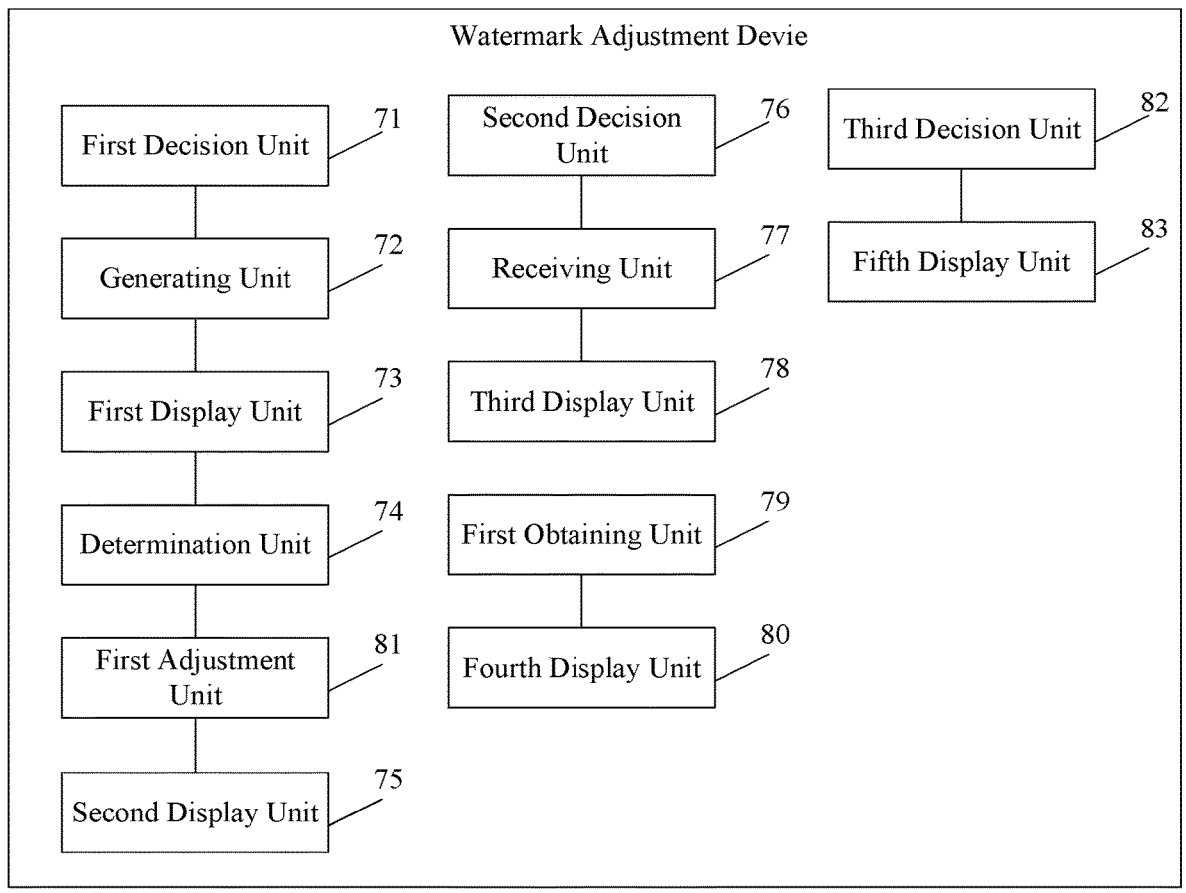
FIG. 16 illustrates a block diagram of another exemplary watermark adjustment device consistent with disclosed embodiments.

In some embodiments, the watermark adjustment device may further include other units as shown in FIG. 16. FIG. 16 illustrates a block diagram of another exemplary watermark adjustment device consistent with disclosed embodiments. As shown in FIG. 16, the exemplary watermark adjustment device further includes a third decision unit 82 and a fifth display unit 83, in addition to the first decision unit 71, the generating unit 72, the first display unit 73, the determination unit 74, the second display unit 75, the second decision unit 76, the receiving unit 77, the third display unit 78, the first obtaining unit 79, the fourth display unit 80, and the first adjustment unit 81.

The third decision unit 82 may be configured to determine whether the user clicks on an edit control.

The fifth display unit 83 may be configured to, when it is determined that the user clicks on the edit control, display the watermark parameter setting interface at a designated position, and display one or more watermark parameter setting controls in the watermark parameter setting interface. The one or more watermark parameter setting controls may at least include, for example, a watermark font setting control, a watermark size setting control, a watermark tilt angle control, and/or a watermark position setting control.

In some embodiments, specifically, the first obtaining unit 79 may be configured to obtain a watermark font selected by the user on the watermark font setting control, and determine a watermark font for use when displaying the watermark in the watermark preview interface according to the user selected watermark font; and/or to obtain a watermark size parameter set by the user on the watermark size setting control, and determine a watermark size for use when displaying the watermark in the watermark preview interface according to the user selected watermark size parameter; and/or to obtain a watermark tilt angle set by the user on the watermark tilt angle control, and determine a watermarking tilt angle for use when displaying the watermark in the watermark preview interface according to the user selected watermark tilt angle; and/or to obtain a watermark position parameter selected by the user on the watermark position setting control, and determine a display position of the watermark in the watermark preview interface according to the user selected watermark position parameter.

Figure 17:
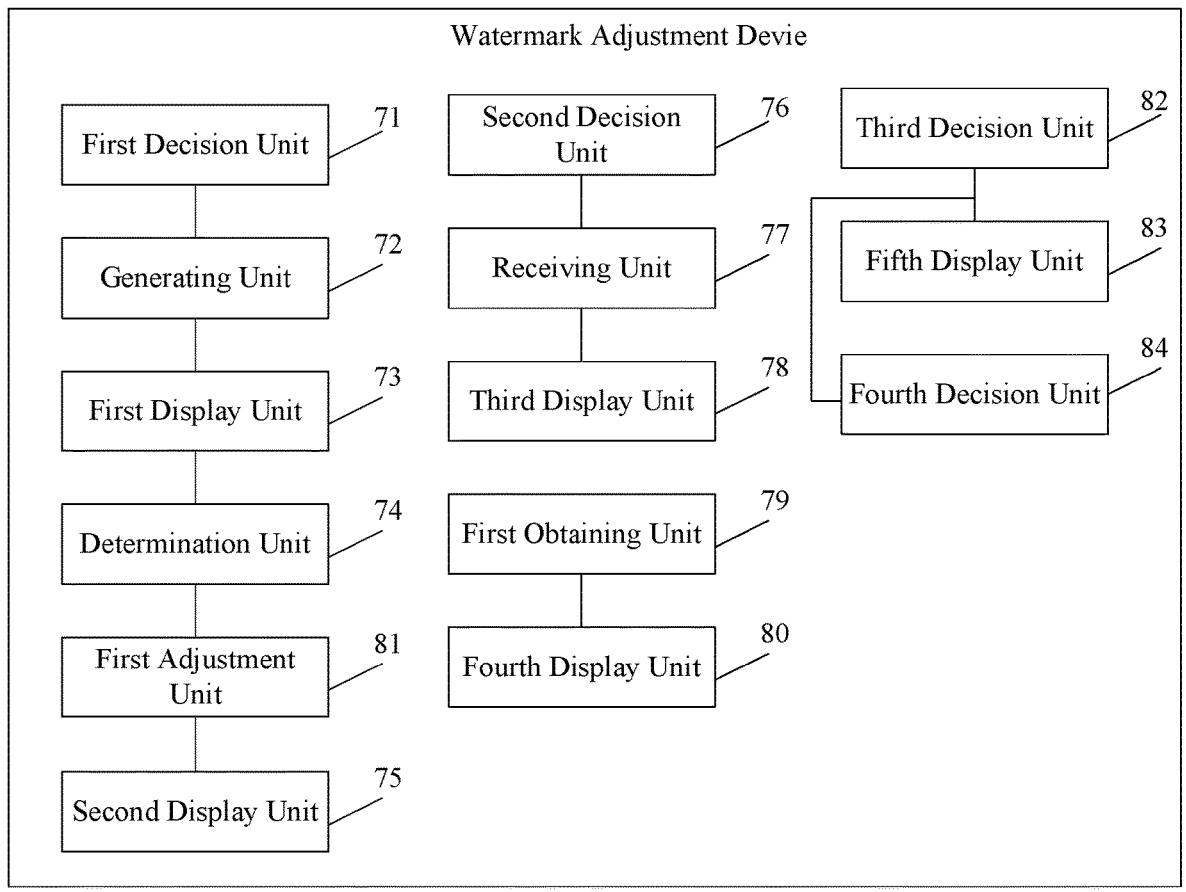
FIG. 17 illustrates a block diagram of another exemplary watermark adjustment device consistent with disclosed embodiments.

In some embodiments, the watermark adjustment device may further include one or more other units as shown in FIG. 17. FIG. 17 illustrates a block diagram of another exemplary watermark adjustment device consistent with disclosed embodiments. As shown in FIG. 17, the exemplary watermark adjustment device further includes a fourth decision unit 84, in addition to the first decision unit 71, the generating unit 72, the first display unit 73, the determination unit 74, the second display unit 75, the second decision unit 76, the receiving unit 77, the third display unit 78, the first obtaining unit 79, the fourth display unit 80, the first adjustment unit 81, the third decision unit 82, and the fifth display unit 83.

The fourth decision unit 84 may be configured to, when the watermark parameter setting interface is at a display status, determine whether the user clicks on the edit control.

The fifth display unit 83 may be further configured to, when it is determined that the user clicks on the edit control and the watermark parameter setting interface is at the display status, hide the watermark parameter setting interface.

In some embodiments, the watermark adjustment device may further include one or more other units as shown in FIG.

Figure 18:
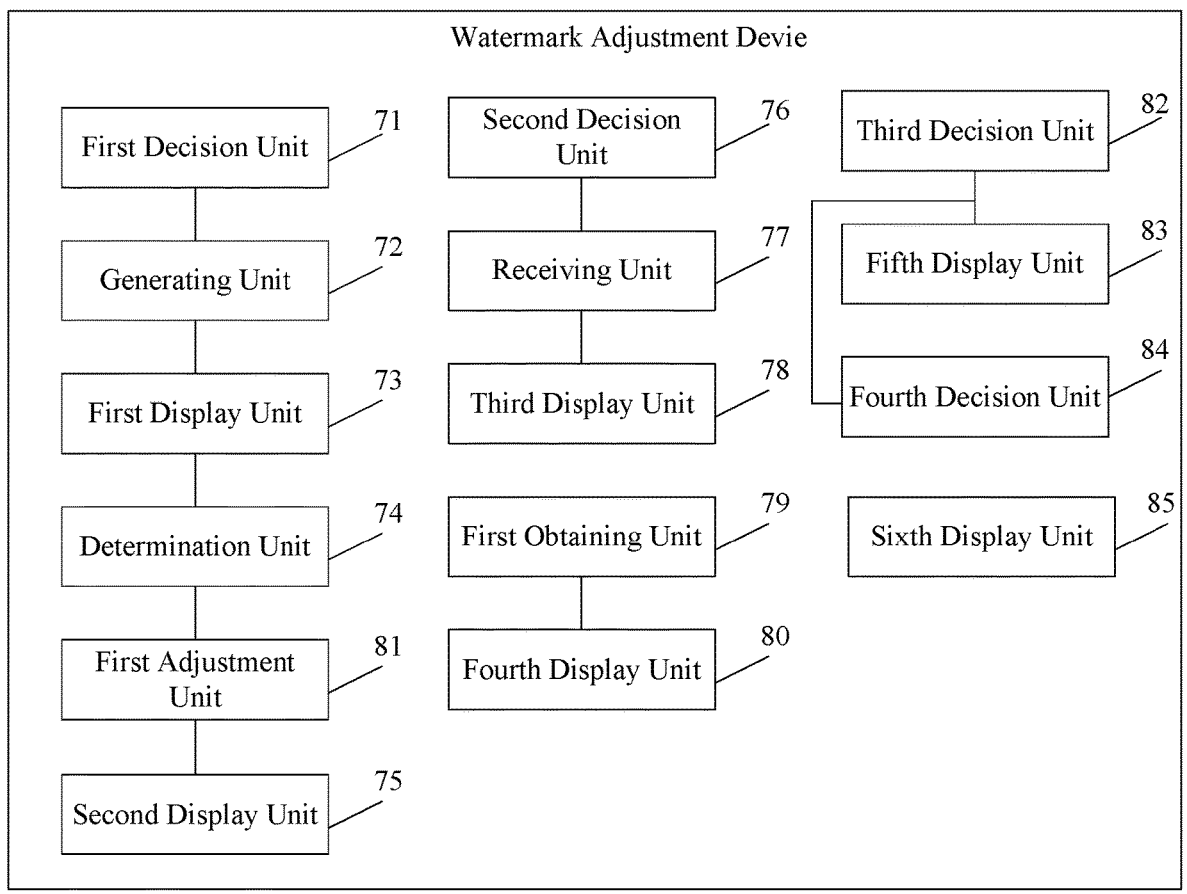
FIG. 18 illustrates a block diagram of another exemplary watermark adjustment device consistent with disclosed embodiments.

18. FIG. 18 illustrates a block diagram of another exemplary watermark adjustment device consistent with disclosed embodiments. As shown in FIG. 18, the exemplary watermark adjustment device further includes a sixth display unit 85, in addition to the first decision unit 71, the generating unit 72, the first display unit 73, the determination unit 74, the second display unit 75, the second decision unit 76, the receiving unit 77, the third display unit 78, the first obtaining unit 79, the fourth display unit 80, the first adjustment unit 81, the third decision unit 82, the fifth display unit 83, and the fourth decision unit 84.

The sixth display unit 85 may be configured to display a print setting interface at a display position of the watermark parameter setting interface, e.g., a previous display position of the watermark parameter setting interface.

Figure 21:
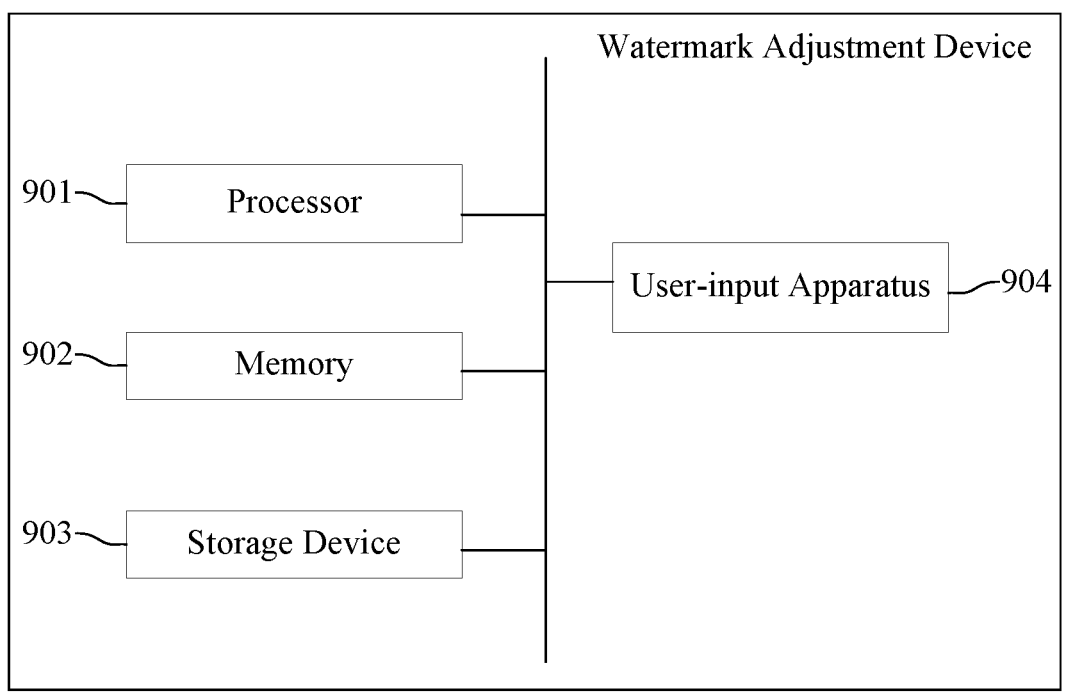
FIG. 21 illustrates a block diagram of an exemplary hardware configuration of an exemplary watermark adjustment device consistent with disclosed embodiments.

FIG. 21 illustrates a block diagram of an exemplary hardware configuration of an exemplary watermark adjustment device consistent with disclosed embodiments. In the exemplary hardware configuration shown in FIG. 21, the exemplary watermark adjustment device includes a processor 901, a memory 902, a storage device 903, and a user-input apparatus 904.

The processor 901 can include, for example, a microprocessor. The memory 902 can include, for example, a read only memory (ROM) and a random access memory (RAM). The storage device 903 can be, for example, a hard disk drive. The user-input apparatus 904 can include, for example, a mouse and a keyboard. In various embodiments of the present disclosure, the memory 902 may be, for example, configured to store instructions for controlling the processor 901 to perform functions consistent with the present disclosure. The exemplary hardware configuration of the exemplary watermark adjustment device shown in FIG. 21 is for illustrative purposes and does not limit the present disclosure.

In the watermark adjustment method and the watermark adjustment device of the present disclosure, when the watermark preview interface is clicked on in a predetermined manner, a text box control may be generated. A text box display parameter may be determined by setting the text box control, i.e., a display of the text box control. The watermark pattern may be displayed in the watermark preview interface according to the text box display parameter.

In conventional technology, in order to achieve a setting effect, the parameters may need to be adjusted repeatedly, and the user may need to switch to different interfaces repeatedly to realize editing and result viewing. As compared to the conventional technology, the present disclosure provides a method that is intuitive and quick, thereby reducing user workload in the watermark printing process.

For a detailed operating process of above-described system, apparatus and unit, reference can be made to the corresponding process in the method embodiments, and the details are not described here again.

The present disclosure provides a method and a device for watermark adjustment, which can reduce the amount of operations in a watermark editing process. The method may include determining whether a user clicks on a watermark preview interface according to a predetermined manner; generating a text box control according to a watermark pattern that is currently displayed, to activate a watermark preview editing status, when it is determined that the user clicks on the watermark preview interface in the predetermined manner; displaying the watermark pattern on the text box control; determining a text box display parameter according to a user setting for the text box control; and adjusting the watermark pattern according to the text box display parameter and displaying the adjusted watermark pattern in the watermark preview interface, when the watermark preview editing status is ended.

It would be understood that, in the embodiments provided in the present disclosure, the disclosed system, apparatus, and method may be implemented in other modes. For example, the above-described apparatus embodiments are merely exemplary. For example, the units are merely divided according to logical functions and can be divided in other manners in actual implementation. For example, multiple units or components can be combined or integrated into another system, or some features can be ignored or not performed. In addition, the mutual coupling or direct coupling or communication connection shown or discussed may include a direct connection or an indirect connection or communication connection through one or more interfaces, devices, or units, which may be electrical, mechanical, or in other form.

The units described as separate parts may or may not be physically separated, and parts displayed as units may or may not be physical units. That is, the units described as separate parts may be integrated in one place or distributed to multiple network elements. A part or all of the units may be selected according to the actual needs to achieve the objectives of the solutions of the embodiments.

In addition, functional units in the embodiments of the present disclosure may be integrated into one processing unit or exist as separate physical units, or two or more units are integrated into one unit. The integrated unit may be implemented through hardware, or may also be implemented in a form of hardware plus a software functional unit.

The integrated unit implemented in the form of the software functional unit may be stored in a computer readable storage medium. The software functional unit may be stored in a storage medium, and may contain several instructions used to instruct computer equipment (for example, a personal computer, a server, or network equipment) or a processor to perform a part of the steps of the methods according to the embodiments of the present disclosure. The storage medium may be any medium that can store program codes, such as a universal-serial-bus (USB) flash drive, a removable hard disk, a read-only memory (ROM), a random access memory (RAM), a magnetic disk, or an optical disk.

The description of the disclosed embodiments is provided to illustrate the present invention to those skilled in the art. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A method of adjusting watermark, comprising:
    determining whether a user clicks on a watermark preview interface;
    when it is determined that the user clicks on the watermark preview interface, generating a text box control according to a watermark pattern that is currently displayed to activate an editing status of the watermark preview interface;
    displaying the watermark pattern on the text box control;
    determining a text box display parameter according to a user setting for the text box control; and when the editing status of the watermark preview interface is ended, adjusting the watermark pattern according to the text box display parameter and displaying the adjusted watermark pattern in the watermark preview interface.

2. The method according to claim 1, further comprising:
determining whether the user starts a watermark drawing mode;
when it is determined that the user starts the watermark drawing mode, receiving a user inputted watermark pattern in a designated region; and
when the watermark drawing mode is ended, displaying the user inputted watermark pattern in the watermark preview interface.

3. The method according to claim 1, further comprising:
obtaining a watermark pattern inputted by the user in a watermark list interface and a watermark parameter inputted by the user in a watermark parameter setting interface, and
displaying the watermark pattern in the watermark preview interface according to the watermark parameter,
wherein the watermark list interface, the watermark parameter setting interface, and the watermark preview interface are in a same display interface.

4. The method according to claim 3, after determining the text box display parameter according to the user setting for the text box control, further comprising:
adjusting a display content in the watermark parameter setting interface according to the text box display parameter.

5. The method according to claim 3, further comprising:
determining whether the user clicks on an edit control;
when it is determined that the user clicks on the edit control, displaying the watermark parameter setting interface at a designated location; and
displaying one or more watermark parameter setting controls in the watermark parameter setting interface, wherein the one or more watermark parameter setting controls at least include a watermark font setting control, a watermark size setting control, a watermark tilt angle control, a watermark position setting control, or a combination thereof.

6. The method according to claim 5, further comprising:
determining whether the user clicks on the edit control when the watermark parameter setting interface is at a display status;
when it is determined that the user clicks on the edit control and the watermark parameter setting interface is at the display status, hiding the watermark parameter setting interface.

7. The method according to claim 6, after hiding the watermark parameter setting interface, further comprising:
displaying a print setting interface at a display position of the watermark parameter setting interface.

8. The method according to claim 1, further comprising:
determining whether the user starts an image watermark editing mode; and
based on the user's selection, displaying a user chosen watermark image in the watermark preview interface.

9. The method according to claim 1, further comprising:
converting a watermark to a target language and displaying the converted watermark in the watermark preview interface, according to the target language selected by the user.

10. A watermark adjustment device, comprising:
a memory storing instructions; and
a processor coupled to the memory and when executing the instructions, configured to:
determine whether a user clicks on a watermark preview interface;
when it is determined that the user clicks on the watermark preview interface, generate a text box control according to a watermark pattern that is currently displayed to activate an editing status of the watermark preview interface;
display the watermark pattern on the text box control;
determine a text box display parameter according to a user setting for the text box control; and
when the editing status of the watermark preview interface is ended, adjust the watermark pattern according to the text box display parameter and display the adjusted watermark pattern in the watermark preview interface.

11. The device of claim 10, the processor is further configured to:
determine whether the user starts a watermark drawing mode;
when it is determined that the user starts the watermark drawing mode, receive a user inputted watermark pattern in a designated region; and
when the watermark drawing mode is ended, display the user inputted watermark pattern in the watermark preview interface.

12. The device according to claim 10, the processor is further configured to:
obtain a watermark pattern inputted by the user in a watermark list interface and a watermark parameter inputted by the user in a watermark parameter setting interface, and
display the watermark pattern in the watermark preview interface according to the watermark parameter,
wherein:
the watermark list interface, the watermark parameter setting interface, and the watermark preview interface are in a same display interface.

13. The device according to claim 12, the processor is further configured to:
adjust a display content in the watermark parameter setting interface according to the text box display parameter.

14. The device according to claim 10, the processor is further configured to:
determine whether the user clicks on an edit control; and
when it is determined that the user clicks on the edit control, display a watermark parameter setting interface at a designated position, and
display one or more watermark parameter setting controls in the watermark parameter setting interface,
wherein:
the one or more watermark parameter setting controls at least include a watermark font setting control, a watermark size setting control, a watermark tilt angle control, a watermark position setting control, or a combination thereof.

15. The device according to claim 14, the processor is further configured to:
determine whether the user clicks on the edit control when the watermark parameter setting interface is at a display status,
wherein:
when it is determined that the user clicks on the edit control and the watermark parameter setting interface is at the display status, hide the watermark parameter setting interface.

16. The device according to claim 15, the processor is further configured to:
   display a print setting interface at a display position of the watermark parameter setting interface.

\* \* \* \* \*